(12) United States Patent
Kitatani

(10) Patent No.: US 9,348,455 B2
(45) Date of Patent: May 24, 2016

(54) DISPLAY APPARATUS, DISPLAY CONTROL METHOD, AND PROGRAM

(75) Inventor: Kenichi Kitatani, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 13/979,690

(22) PCT Filed: Nov. 25, 2011

(86) PCT No.: PCT/JP2011/077118
§ 371 (c)(1),
(2), (4) Date: Jul. 15, 2013

(87) PCT Pub. No.: WO2012/114592
PCT Pub. Date: Aug. 30, 2012

(65) Prior Publication Data
US 2013/0293502 A1    Nov. 7, 2013

(30) Foreign Application Priority Data

Feb. 21, 2011   (JP) .................. 2011-034702

(51) Int. Cl.
| | | |
|---|---|---|
| G06F 3/041 | (2006.01) | |
| G06F 3/045 | (2006.01) | |
| G09G 5/00 | (2006.01) | |
| G06F 3/0488 | (2013.01) | |

(52) U.S. Cl.
CPC ............ *G06F 3/0416* (2013.01); *G06F 3/0488* (2013.01); *G06F 2200/1614* (2013.01)

(58) Field of Classification Search
CPC ............... G06F 3/0317; G06F 3/0423; G06F 2200/1614; G06F 3/0416; G06F 3/0488

USPC .................................................. 345/173–178
See application file for complete search history.

(56) References Cited

U.S. PATENT DOCUMENTS

| 8,502,800 B1 * | 8/2013 | Vier .............................. 345/174 |
| 2009/0002391 A1 * | 1/2009 | Williamson et al. .......... 345/619 |
| 2010/0090971 A1 * | 4/2010 | Choi et al. .................... 345/173 |
| 2010/0285844 A1 | 11/2010 | Hosoi et al. |
| 2012/0154293 A1 * | 6/2012 | Hinckley et al. .............. 345/173 |

FOREIGN PATENT DOCUMENTS

| CN | 101529371 A | 9/2009 |
| JP | 2001242845 A | 9/2001 |
| JP | 2005-071008 A | 3/2005 |

(Continued)

OTHER PUBLICATIONS

Communication dated Aug. 18, 2015 from the Japanese Patent Office issued in corresponding Japanese application No. 2013500834.

(Continued)

*Primary Examiner* — Amit Chatly
(74) *Attorney, Agent, or Firm* — Sughrue Mion, PLLC

(57) ABSTRACT

There is provided a display apparatus capable of reducing user annoyance by displaying display information in an appropriate output format. Touch panel 12 detects a touch to a display surface of display device 11. Sensor section 13 detects an apparatus orientation. Display control section 14 changes an output format of display information displayed on a display surface according to the apparatus orientation. When the touch is detected, display lock detecting section 15 locks the changed output format of display information.

9 Claims, 6 Drawing Sheets

(56) References Cited

FOREIGN PATENT DOCUMENTS

| JP | 2008-027453 A | 2/2008 |
| JP | 2010-252197 A | 11/2010 |
| JP | 2010-263433 A | 11/2010 |

OTHER PUBLICATIONS

Communication dated Aug. 25, 2015 from the State Intellectual Property Office of the People's Republic of China in counterpart application No. 201180068095.5.

* cited by examiner

DISPLAY APPARATUS, DISPLAY CONTROL METHOD, AND PROGRAM

CROSS REFERENCE TO RELATED APPLICATIONS

This application is a National Stage of International Application No. PCT/JP2011/077118 filed Nov. 25, 2011, claiming priority based on Japanese Patent Application No. 2011-034702 filed Feb. 21, 2011, the contents of all of which are incorporated herein by reference in their entirety.

TECHNICAL FIELD

The present invention relates to a display apparatus that changes an output format of display information according to an apparatus orientation.

BACKGROUND ART

Some display apparatuses may display information in an appropriate output format by controlling the output format of display information displayed on a display surface according to an apparatus orientation detected using an acceleration sensor or the like. For example, the apparatus orientation is represented by the relative relationship between the direction of the display surface and the direction of gravity. In this case, for example, when the display surface becomes substantially parallel to the direction of gravity, the display apparatus aligns the direction of display information with the direction of gravity to thereby display the display information so as to be readily visible to a user.

However, if the output format of display information is fully automatically controlled in such a display apparatus as described above, inconvenience may occur.

For example, consider a case in which the direction of display information is aligned with the direction of gravity. In this case, when the user lies on a sofa or a bed with the face oriented in a horizontal direction, the direction is such that the display information is not well visible to the user. In addition, consider a case in which the user uses the display apparatus with the display surface oriented in a horizontal direction such as when a map is displayed or when the user looks at the screen together with other people. In this case, only a slight tilt of the display apparatus by the user may change the direction of display information. In addition, consider a case in which the user temporarily puts the display apparatus held by the hand on a desk or the like and then picks it up. Each operation of putting and picking up the display apparatus may change the direction of display information.

Alternatively, there can be considered a display apparatus that represents the apparatus orientation not by a relative relationship between the direction of the display surface and the direction of gravity but by a relative relationship between the direction of the display surface and the direction of the user's face. In this case, the display apparatus changes the output format of display information according to the direction of the user's face detected, for example, by a camera or the like. However, in the case in which the output format of display information is fully automatically controlled, if the camera detects a plurality of user's faces, the output format is frequently changed, and thus even such a display apparatus may cause the user to be annoyed.

As described above, such a display apparatus that fully automatically controls the output format of display information has a problem of causing inconvenience.

As a technique capable of solving the above problem, there can be considered a technique for allowing the user to select whether or not the output format of display information is automatically controlled. However, such a technique requires the user to preset whether or not the output format of display information is automatically controlled or not, which is inconvenient to the user.

Alternatively, there can be considered a display apparatus that does not change the direction of display information if the apparatus orientation is changed while a predetermined key is being pressed. However, such a display apparatus does not allow the user to change the direction of display information by an intuitive operation, but requires the user to learn key functions, which is inconvenient to the user.

In view of this, Patent Literatures 1 and 2 disclose a technique that allows the user to change the direction of display information by intuitive operation using a touch panel. Even if the direction of display information is inappropriate, this technique allows the user to change the direction of display information to an appropriate direction by intuitive operation.

CITATION LIST

Patent Literature

Patent Literature 1: JP2008-27453A
Patent Literature 2: JP2010-252197A

SUMMARY OF INVENTION

Technical Problem

However, according to the techniques disclosed in Patent Literatures 1 and 2, each time the direction of display information is inappropriate, the user is required to change the direction of display information to an appropriate direction accordingly, which has a high probability of causing to the user to be annoyed.

An object of the present invention is to provide a display apparatus, a display control method, and a program capable of reducing annoyance for displaying display information in an appropriate output format.

Solution to Problem

A display apparatus comprises: a display section that has a display surface; a touch detection section that detects a touch to the display surface; an orientation detection section that detects an apparatus orientation; a control section that changes an output format of display information displayed on the display surface according to the apparatus orientation; and a lock section that locks the changed output format when the touch is detected.

A display control method comprises: detecting an apparatus orientation; changing an output format of display information displayed on a display surface according to the apparatus orientation; detecting a touch to the display surface; and locking the changed output format when the touch is detected.

A program for causing a computer to execute: a procedure for detecting an apparatus orientation; a procedure for changing an output format of display information displayed on a display surface according to the apparatus orientation; a procedure for detecting a touch to the display surface; and a procedure for locking the changed output format when the touch is detected.

Advantageous Effects of Invention

It is possible to reduce annoyance when displaying display information in an appropriate output format.

DESCRIPTION OF EMBODIMENTS

Figure 1:
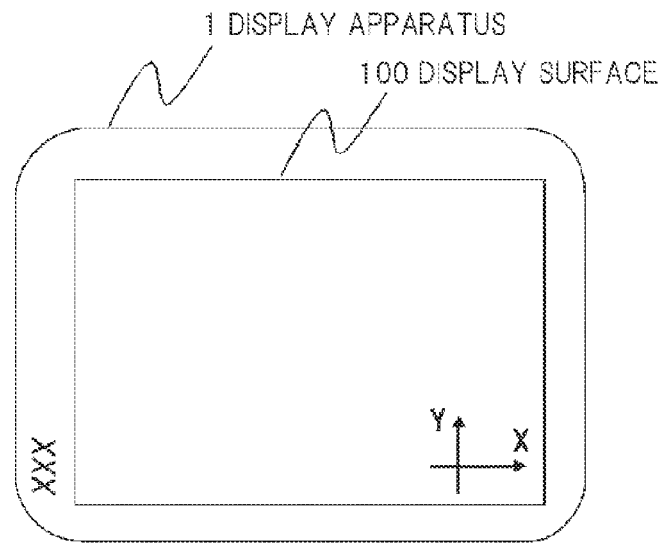
FIG. 1 is a front view of a display apparatus according to a first exemplary embodiment.

The following a description of exemplary embodiments with reference to the accompanying drawings. Note that in the following description, the same reference numerals or characters are assigned to the components having same function and the description thereof may be omitted.

FIG. 1 is a front view of a display apparatus according to a first exemplary embodiment. In FIG. 1, display apparatus 1 includes display surface 100 that displays various display information such as text information and image information.

Figure 2:
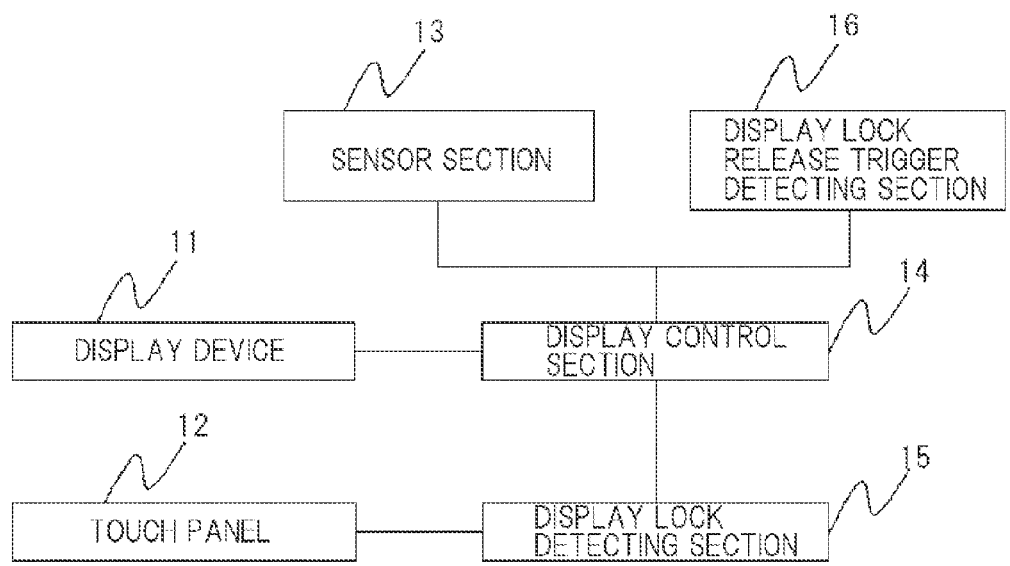
FIG. 2 illustrates a functional configuration of the display apparatus according to the first exemplary embodiment.

FIG. 2 illustrates a functional configuration of display apparatus 1. In FIG. 2, display apparatus 1 includes display device 11, touch panel 12, sensor section 13, display control section 14, display lock detecting section 15, and display lock release trigger detecting section 16.

Display device 11 is a display section having display surface 100.

Touch panel 12 is a touch detection section that detects a touch to display surface 100 of display device 11. The touch refers to a contact or a pressing.

More specifically, touch panel 12 detects a touch to display surface 100, and outputs position information indicating a touch position touched on display surface 100 to display lock detecting section 15. At this time, when a plurality of locations of display surface 100 are touched, touch panel 12 outputs a plurality of position information items indicating each of a plurality of touch positions that correspond to the plurality of locations to display lock detecting section 15.

Sensor section 13 is an orientation detection section that detects an apparatus orientation of display apparatus 1 and outputs orientation information indicating the apparatus orientation to display control section 14. For example, sensor section 13 uses an acceleration sensor, an angular velocity sensor, or the like to detect the relative relationship between the direction of display surface 100 and the direction of gravity as the apparatus orientation. Alternatively, sensor section 13 may use a camera or the like to detect the direction of the user's face and to detect the relative relationship between the direction of display surface 100 and the direction of the user's face as the apparatus orientation.

Display control section 14 changes the output format of display information displayed on display surface 100 of display device 11 according to the orientation information from sensor section 13. The output format of display information represents the direction of display information, the position of display information, the size of display information, and the like. Note that the direction of display information is defined by the direction relative to display surface 100. For example, the direction of display information is defined by a direction relative to two directions (XY directions in FIG. 1) within display surface 100.

More specifically, display control section 14 determines whether or not the apparatus orientation of display apparatus 1 satisfies a change condition based on the orientation information. If the apparatus orientation of display apparatus 1 satisfies the change condition, display control section 14 changes the output format of display information based on the orientation information.

Figure 3:
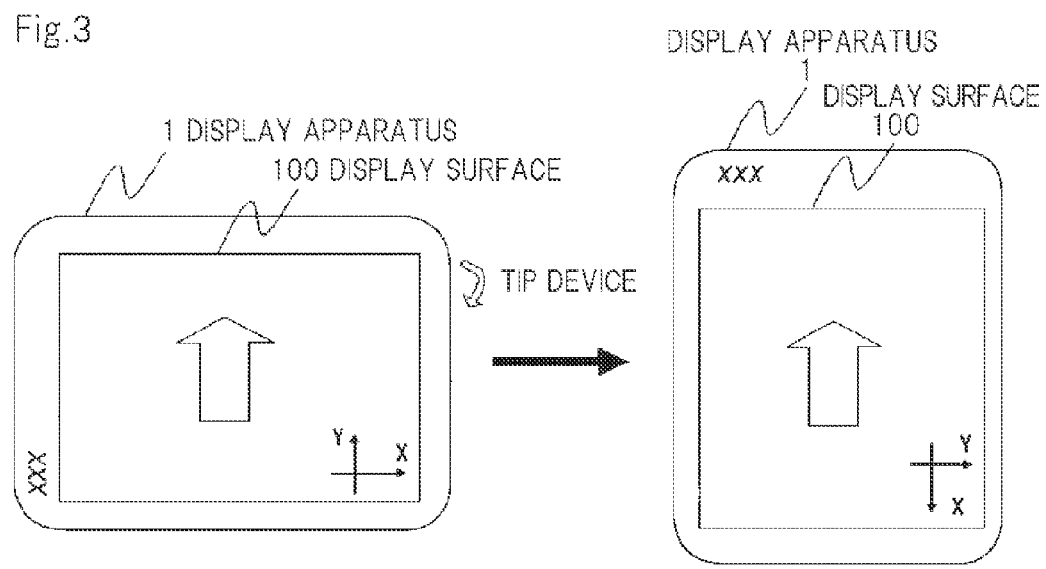
FIG. 3 describes an example of a change in the output format of display information.

For example, as illustrated in FIG. 3, when display apparatus 1 is rotated by a predetermined angle (such as about 90 degrees) or more around an axis normal to the display surface 100, display control section 14 rotates the direction of display information by 90 degrees to the opposite direction to the direction of rotation of display apparatus 1. In this case, for example, as illustrated by an arrow in FIG. 3, the direction of display information is changed from +Y direction to −X direction.

Alternatively, display control section 14 may change the display format of display information not according to the rotation of display apparatus 1 around the axis normal to display surface 100 but according to the rotation of display apparatus 1 around the axis tangent to display surface 100. In this case, when the user tilts display apparatus 1, the display information can be tilted according to the tilt. Further, display control section 14 may zoom in or out the display information or perform parallel movement thereof according to the apparatus orientation.

Display lock detecting section 15 is a lock section that performs a display lock of locking the changed output format of display information by display control section 14 when a touch is detected by touch panel 12.

More specifically, when position information is received from touch panel 12, display lock detecting section 15 determines whether or not touching to display surface 100 satisfies a predetermined determination condition based on the position information. If the touch satisfies the determination condition, display lock detecting section 15 performs a display lock on display control section 14.

Figure 4:
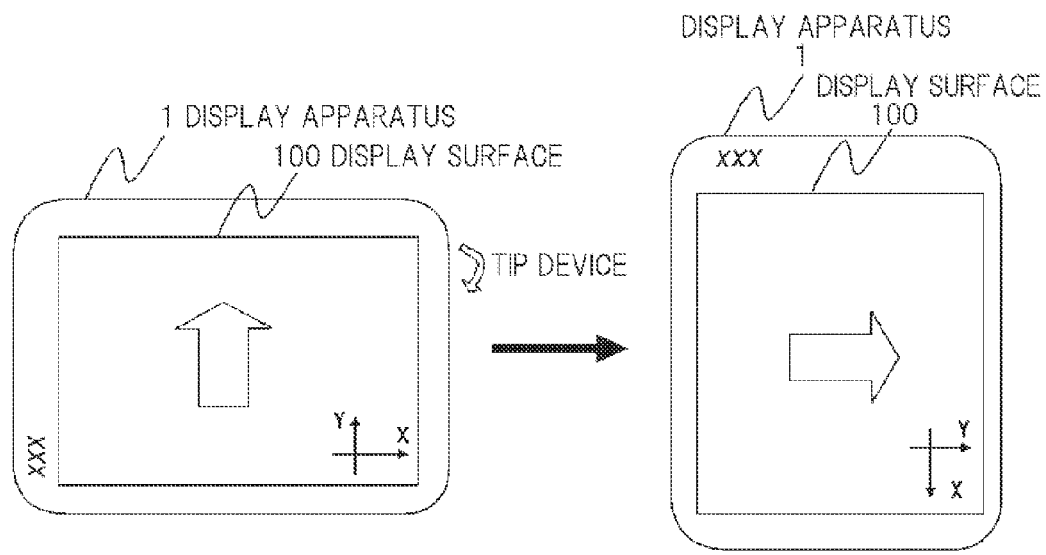
FIG. 4 describes another example of a change in the output format of display information.

This makes it possible to prevent the output format of display information from being changed even if the apparatus orientation of display apparatus 1 is changed. For example, as illustrated in FIG. 3, if display apparatus 1 is rotated by a predetermined value or higher, the direction of display information is rotated, but if a touch satisfying the determination condition is performed, as illustrated in FIG. 4, the rotation of the display information can be locked.

Display lock release trigger detecting section 16 detects whether or not a predetermined lock release trigger occurs. If the lock release trigger occurs, display lock release trigger detecting section 16 releases the display lock that display lock detecting section 15 performed on display control section 14.

Next, an operation of display apparatus 1 will be described.

Figure 5A:
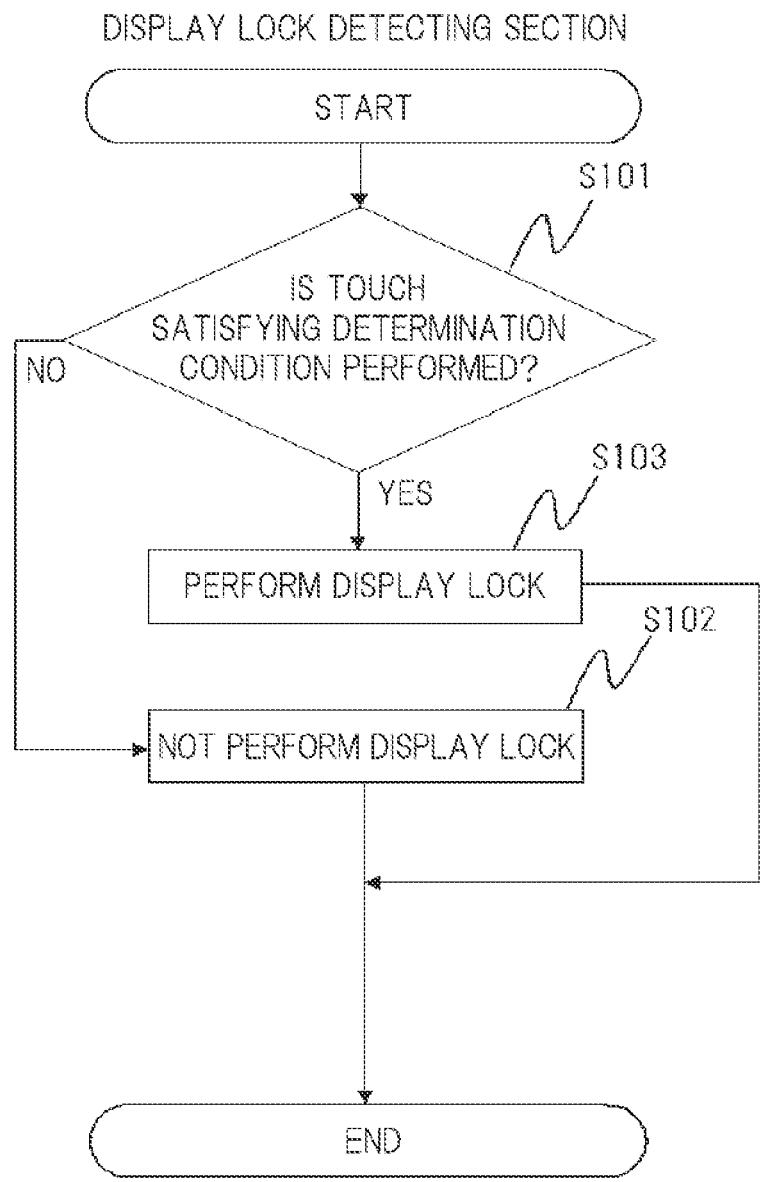
FIG. 5A is a flowchart for describing an example of the operation of a display lock detecting section.

FIG. 5A is a flowchart for describing an example of an operation of display lock detecting section 15.

First, display lock detecting section 15 determines whether or not touching display surface 100 satisfies a determination condition based on position information received from touch panel 12 (step S101). The present exemplary embodiment assumes that the determination condition is touching a plurality of locations of display surface 100. In this case, when a plurality of position information items are received, display lock detecting section 15 determines that the touching display surface 100 satisfies the determination condition.

If the touch does not satisfy the determination condition, display lock detecting section 15 ends processing without performing a display lock on display control section 14 (step S102).

Meanwhile, if the touch satisfies the determination condition, in order to perform a display lock, display lock detecting section 15 outputs a display lock command which has the effect of performing a display lock to display control section 14. Then, while a touch satisfying the determination condition is being detected, display lock detecting section 15 continues to output the display lock command. If a touch satisfying the determination condition is not detected, display lock detecting section 15 stops outputting the display lock command (step S103), and then ends processing.

Figure 5B:
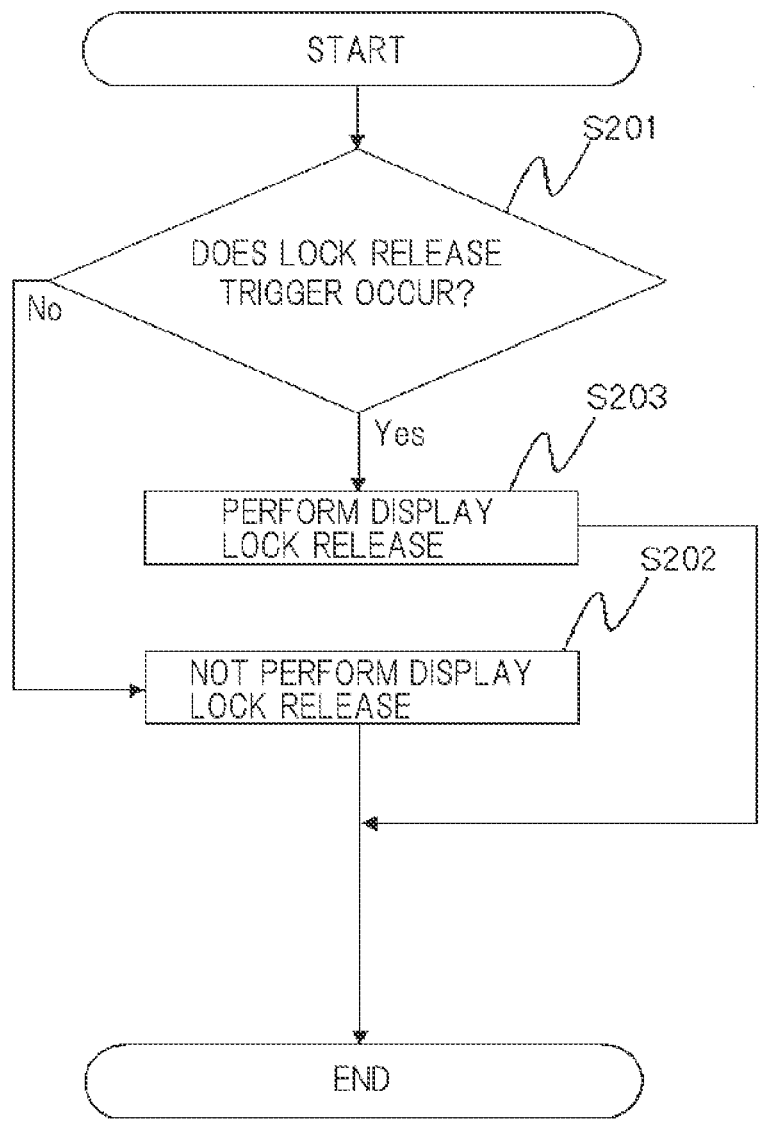
FIG. 5B is a flowchart for describing an example of the operation of a display lock release trigger detecting section.

FIG. 5B is a flowchart for describing an example of the operation of display lock release trigger detecting section 16.

First, display lock release trigger detecting section 16 detects whether or not a lock release trigger occurs (step S201).

If no lock release trigger occurs, display lock release trigger detecting section 16 ends processing without performing a display lock release on display control section 14 (step S202).

Meanwhile, if a lock release trigger occurs, in order to release display lock, display lock release trigger detecting section 16 outputs a display lock release command which has the effect of releasing the display lock to display control section 14 (step S203), and ends processing.

Figure 5C:
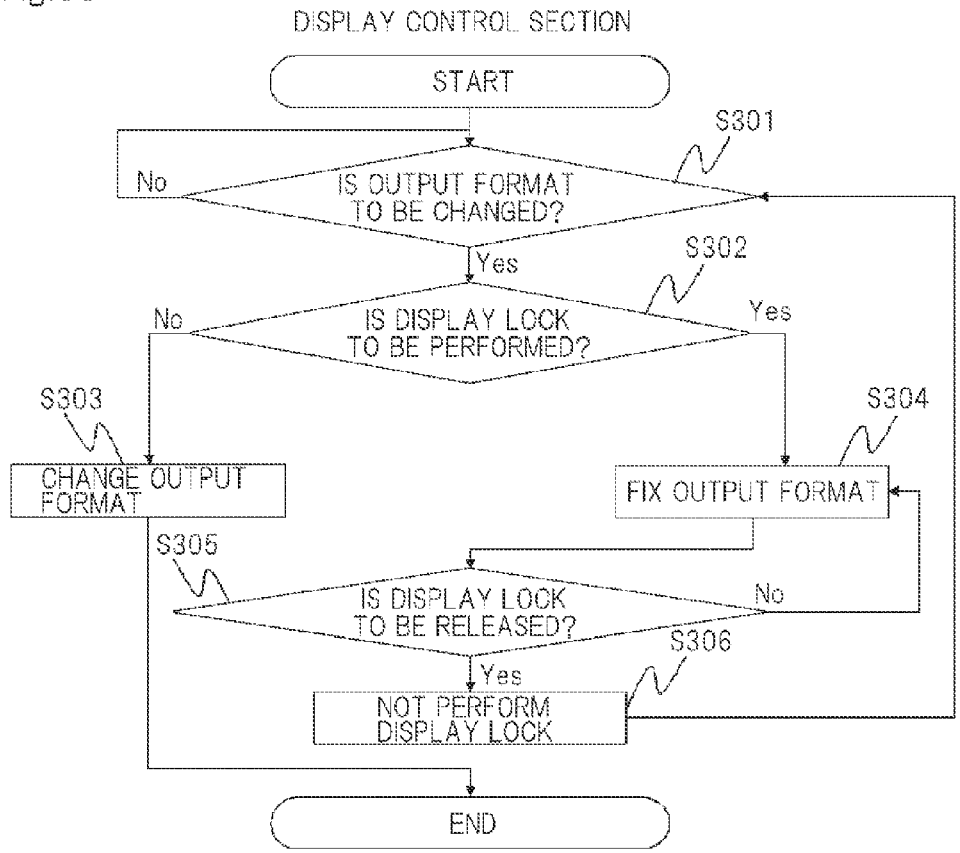
FIG. 5C is a flowchart for describing an example of the operation of display control section 14.

FIG. 5C is a flowchart for describing an example of operation of display control section 14.

Display control section 14 determines whether or not to change the output format of display information displayed on display surface 100 of display device 11 based on the orientation information received from sensor section 13 (step S301).

If the output format of display information is to be changed, display control section 14 determines whether or not to perform a display lock (step S302).

For example, when display control section 14 determines to change the output format of display information, display control section 14 confirms whether or not a display lock command is outputted from display lock detecting section 15. If the display lock command is outputted, display control section 14 performs a display lock. Alternatively, a determination may be made such that display control section 14 monitors the output of a display lock command; if a display lock command is outputted, display control section 14 keeps the display lock command; and when the output format of display information is determined to be changed while the display lock command is kept, display control section 14 may determine to perform a display lock.

If a display lock is not to be performed, display control section 14 changes the output format of display information displayed on display surface 100 according to the orientation information (step S303), and ends processing.

Meanwhile, if a display lock is to be performed, display control section 14 performs a display lock setting so that the output format of display information displayed on display surface 100 is kept fixed to a current output format (step S304).

Then, display control section 14 confirms whether or not a display lock release command is outputted from display lock release trigger detecting section 16 to thereby determine whether or not a lock release trigger is detected (step S305).

If no lock release trigger is detected, display control section 14 returns to step S304.

Meanwhile, if a lock release trigger is detected, display control section 14 releases the display lock setting (step S306), and returns to step S301.

Alternatively, a configuration may be such that while a touch satisfying the determination condition is being performed, display lock detecting section 15 keeps the lock status instruction which has the effect of performing a display lock; and then, when a lock release trigger is detected, display lock release trigger detecting section 16 maintains the lock release instruction which has the effect of releasing the display lock.

In this case, in step S302 of FIG. 5C, display control section 14 confirms whether or not display lock detecting section 15 maintains the lock status instruction to thereby determine whether or not to perform a display lock. In step S305, display control section 14 confirms whether or not display lock release trigger detecting section 16 keeps a lock release instruction to thereby determine whether or not a lock release trigger is detected. If a lock release trigger is detected, in step S306, display control section 14 deletes the lock release instruction kept by display lock release trigger detecting section 1 and the lock status instruction kept by display lock detecting section 15, and at the same time releases the display lock setting, and then returns to step S301.

Note that the operation described above assumes that the determination condition is a touch to a plurality of locations, but without being limited to this example, may be the following conditions or a combination thereof.

For example, the determination condition may indicate that in addition to being touching to a plurality of locations, the maximum distance of the distances between each location is equal to or greater than a predetermined specific value. In this case, when a plurality of position information items are received from touch panel 12, display lock detecting section 15 calculates a maximum distance based on the position information and determines whether or not the maximum distance is equal to or greater than the specific value. If the maximum distance is equal to or greater than the specific value, display lock detecting section 15 performs a display lock.

Alternatively, the determination condition may indicate touching a predetermined specific region on display surface 100. In this case, display lock detecting section 15 preliminarily keeps a region range as a range of touch positions corresponding to the specific region. When position information is received from touch panel 12, display lock detecting section 15 determines whether or not the touch position indicated by the position information is included in the region range. If the touch position is included in the region range, display lock detecting section 15 performs a display lock.

The specific region may be one region or a plurality of regions. If the specific region is a plurality of regions, the determination condition may indicate touching to any one of the plurality of specific regions or a touch to all of the plurality of specific regions. Note that examples of the specific region include a region near the left and right ends of display surface 100, a region near the upper and lower ends of display surface 100, a region in which a specific key is displayed on a software keyboard, and the like. Moreover, in order to allow the user to easily identify the specific region, display control section 14 may display information indicating the specific region on display surface 100.

Alternatively, the determination condition may indicate touching three or more locations. In this case, touching to two locations on display surface 100 may be allocated, for example, to a pinch operation to zoom in or out the display information.

Examples of the display lock release trigger for releasing the display lock include the following events or a combination thereof.

For example, the display lock release trigger is a mechanism in which the apparatus orientation detected by sensor section 13 satisfies a predetermined release condition. The release condition may indicate that the condition is the same as the change condition for display control section 14 to change the display format, that an acceleration equal to or greater than a predetermined threshold is detected, or that a predetermined number or more of accelerations with a mutually different direction is detected in a predetermined period.

If the release condition is the same as the change condition, display lock is performed, and then the user moves display apparatus 1 so as to change the output format of display information, resulting in the display lock being released. Alternatively, if the release condition indicates that an acceleration equal to or greater than the threshold is detected, the user strongly moves display apparatus 1, resulting in the display lock being released. Alternatively, if the release condition indicates that a predetermined number or more of accelerations with a mutually different direction are continuously detected in a predetermined period, the user shakes display apparatus 1, resulting in the display lock being released.

Alternatively, the display lock release trigger may be such that a predetermined time has elapsed since the display lock was performed; a user operation is performed after the display lock was performed; or a predetermined time has elapsed without a user operation being executed since the display lock was performed. Note that the user operation may be touching display surface 100; an operation to an operation device other than touch panel 12 like a hardware key provided on display apparatus 1; or both of touching to display surface 100 and an operation to the operation device.

Further, if display control section 14 executes an application program and displays a screen of the application program on display surface 100 as display information, the display lock release trigger may be such that execution of the application program is ended.

As described above, according to the present exemplary embodiment, when a touch to display surface 100 is detected, the changed output format of display information is locked. Thus, if the user does not want to change the output format of display information, the user may touch display surface 100 in such a feeling as to press an object with fingers so as not to move, and then the user can lock the changed output format of display information. Thus, the user can prevent the display information from being displayed in an inappropriate output format by intuitive operation, which can reduce user annoyance by displaying display information in an appropriate output format.

Next, a second exemplary embodiment will be described.

In the first exemplary embodiment, display lock detecting section 15 collectively locks the changed output format of display information displayed on display surface 100. Meanwhile, in the present exemplary embodiment using a plurality of display information items, display lock detecting section 15 locks at least one changed output format from among the plurality of display information items.

Figure 6:
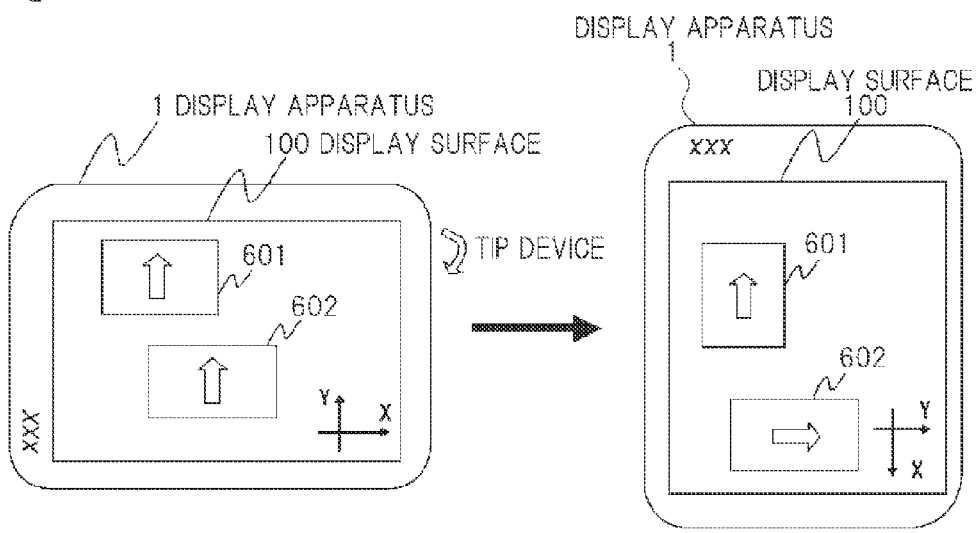
FIG. 6 describes a display apparatus according to a second exemplary embodiment.

For example, as illustrated in FIG. 6, assume that display control section 14 displays windows 601 and 602 as display information on display surface 100. At this time, for example, when a touch is detected by touch panel 12, display lock detecting section 15 outputs a display lock command which has the effect of performing a display lock on an active window (assumed to be window 602) to display control section 14. When the display lock command is received, display control section 14 performs a display lock on the active window.

In this case, as illustrated in FIG. 6, when display apparatus 1 is moved in such a manner that the apparatus orientation satisfies the change condition, the output format of the active window 602 is not changed but the output format of window 601 other than window 602 is changed.

Note that display lock detecting section 15 may perform a display lock on a window displayed in a touched location.

Next, a third exemplary embodiment will be described.

The present exemplary embodiment assumes that display device 11 has a plurality of display surfaces. In this case, display lock detecting section 15 locks the changed output format of display information displayed on at least one display surface of the plurality of display surfaces.

Figure 7:
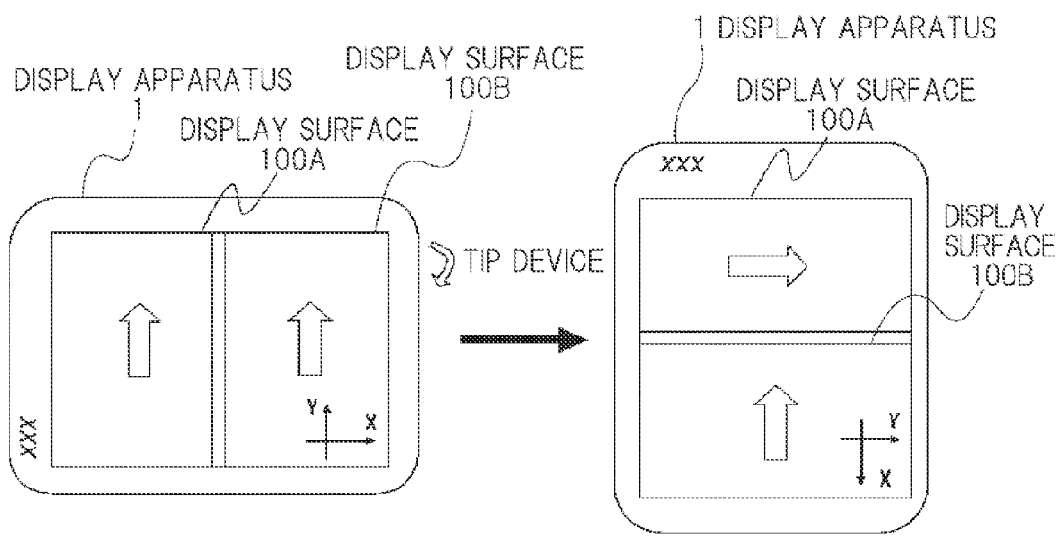
FIG. 7 describes a display apparatus according to a third exemplary embodiment.

For example, as illustrated in FIG. 7, if there are two display surfaces 100A and 100B, display lock detecting section 15 performs a display lock on display information displayed on display surface 100 to which has been touched.

Next, a fourth exemplary embodiment will be described.

Figure 8:
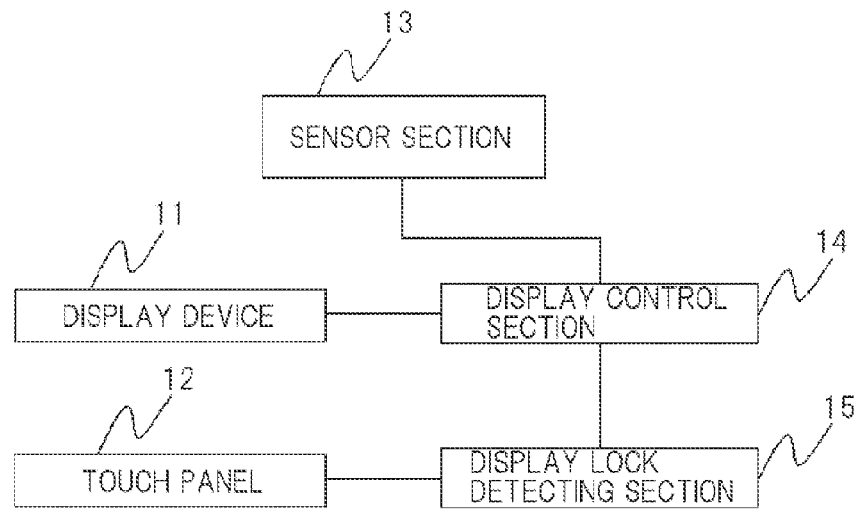
FIG. 8 illustrates a functional configuration of a display apparatus according to a fourth exemplary embodiment.

FIG. 8 illustrates a configuration of a display apparatus according to the fourth exemplary embodiment. The display apparatus illustrated in FIG. 8 includes display device 11, touch panel 12, sensor section 13, display control section 14, and display lock detecting section 15.

In the display apparatus illustrated in FIG. 8, touch panel 12 detects a touch to a display surface of display device 11. Sensor section 13 detects an apparatus orientation. Display control section 14 changes an output format of display information displayed on the display surface according to the apparatus orientation. When touching is detected, display lock detecting section 15 locks the changed output format of display information.

Thus, when touching display surface 100 is detected, the present exemplary embodiment also locks the changed output format of display information, which can reduce user annoyance for displaying display information in an appropriate output format.

Note that the above described function of display apparatus 1 may be implemented such that programs for implementing the function are recorded on a computer-readable recording medium and the programs recorded on the recording medium are read and executed by a computer.

In each of the above described exemplary embodiments, each illustrated configuration is just an example and the present invention is not limited to the configuration. In addition, the present invention can be applied to a personal computer, a mobile phone, a portable device such as an electronic book terminal, and other devices.

In addition, some or all of the above exemplary embodiments can be described as the following appendices, but are not limited to the following.

APPENDIX 1

A display apparatus comprising:
a display section that has a display surface;

a touch detection section that detects a touch to the display surface;

an orientation detection section that detects an apparatus orientation;

a control section that changes an output format of display information displayed on the display surface according to the apparatus orientation; and a lock section that locks the changed output format when the touch is detected.

APPENDIX 2

The display apparatus according to appendix 1, further comprising a lock release section that detects whether or not a predetermined lock release trigger occurs; and if the lock release trigger occurs, releases the locked state of the changed output format.

APPENDIX 3

The display apparatus according to appendix 2, wherein the lock release trigger includes the apparatus orientation satisfying a predetermined release condition.

APPENDIX 4

The display apparatus according to appendix 3, wherein if the apparatus orientation satisfies the predetermined release condition, the control section changes the output format; and the release condition includes the same content as that of the change condition.

APPENDIX 5

The display apparatus according to appendix 3 or 4, wherein the orientation detection section detects an acceleration as the apparatus orientation; and the release condition includes the orientation detection section detecting an acceleration equal to or greater than a threshold.

APPENDIX 6

The display apparatus according to any one of appendices 3 to 5, wherein the lock release trigger includes the elapse of a predetermined time after the lock was performed.

APPENDIX 7

The display apparatus according to any one of appendices 3 to 5, wherein the lock release trigger includes the elapse of a predetermined time without any detection of the touching made to the display surface after the lock was performed.

APPENDIX 8

The display apparatus according to any one of appendices 3 to 7, wherein the lock release trigger includes the detection of a touch.

APPENDIX 9

The display apparatus according to any one of appendices 3 to 8, wherein the control section executes an application program and displays a screen of the application program on the display surface as the display information; and the lock release trigger includes termination of the application program.

This application is based upon and claims the benefit of priority from the prior Japanese Patent Application 2011-034702 filed on Feb. 21, 2011, the entire contents of which are incorporated herein by reference.

REFERENCE SIGNS LIST

1 display apparatus
11 display device
12 touch panel
13 sensor section
14 display control section
15 display lock detecting section
16 display lock release trigger detecting section
100 display surface

What is claimed is:

1. A display apparatus comprising:
a display section that has a display surface;
a touch detection section that detects a touch to the display surface;
an orientation detection section that detects an acceleration as an apparatus orientation;
a control section that changes an output format of display information displayed on the display surface according to the apparatus orientation;
a lock section that locks the changed output format when the touch is detected; and
a lock release section that detects whether or not a predetermined lock release trigger occurs, and, if the predetermined lock release trigger occurs, releases the locked state of the changed output format,
wherein the predetermined lock release trigger comprises the apparatus orientation satisfying a predetermined release condition, the predetermined release condition comprising the orientation detection section detecting an acceleration greater than or equal to a threshold, and
wherein the predetermined lock release trigger further comprises a lapse of a predetermined time without the touch detection section detecting the touch to the display surface after the lock section locks the changed output format.

2. The display apparatus according to claim 1, wherein when the touch is detected, if the touch that is made to the display satisfies a predetermined determination condition, said lock section locks the changed output format.

3. The display apparatus according to claim 2, wherein the predetermined determination condition indicates that touching a plurality of locations of the display surface.

4. The display apparatus according to claim 2, wherein the predetermined determination condition indicates a touch to a specific region of the display surface.

5. The display apparatus according to claim 3, wherein the predetermined determination condition indicates that a maximum distance of the distances between the plurality of locations is equal to or greater than a specific value.

6. The display apparatus according to claim 1, wherein
the display information is a plurality of display information items; and
said lock section locks at least one changed output format of display information of the plurality of display information items.

7. The display apparatus according to claim 1, wherein the display surface is a plurality of display surfaces; and said lock section locks the changed output format of display information displayed on at least one display surface of the plurality of display surfaces.

8. A display control method comprising:

detecting an acceleration as an apparatus orientation;

changing an output format of display information displayed on a display surface according to the apparatus orientation;

detecting a touch to the display surface;

locking the changed output format when the touch is detected;

detecting whether or not a predetermined lock release trigger occurs; and releasing, in response to the predetermined lock release trigger occurring, the locked state of the changed output format, wherein the predetermined lock release trigger comprises the apparatus orientation satisfying a predetermined release condition, the predetermined release condition comprising the orientation detection section detecting an acceleration greater than or equal to a threshold, and wherein the predetermined lock release trigger further comprises a lapse of a predetermined time without any detection of a touch to the display surface after the locking is performed.

9. A non-transitory computer readable medium storing a program for causing a computer to execute:

a procedure for detecting an acceleration as an apparatus orientation;

a procedure for changing an output format of display information displayed on a display surface according to the apparatus orientation;

a procedure for detecting a touch to the display surface;

a procedure for locking the changed output format when the touch is detected; and a procedure for detecting whether or not a predetermined lock release trigger occurs, and, if the predetermined lock release trigger occurs, releasing the locked state of the changed output format, wherein the predetermined lock release trigger comprises the apparatus orientation satisfying a predetermined release condition, the predetermined release condition comprising the orientation detection section detecting an acceleration greater than or equal to a threshold, and wherein the predetermined lock release trigger further comprises a lapse of a predetermined time without any detection of a touch to the display surface after the procedure for locking is performed.

* * * * *